(12) United States Patent
Evans et al.

(10) Patent No.: US 9,632,219 B2
(45) Date of Patent: Apr. 25, 2017

(54) SPHERICALLY MOUNTED RETROREFLECTOR THAT INCLUDES A REPLICATED CUBE CORNER

(71) Applicant: FARO Technologies, Inc., Lake Mary, FL (US)

(72) Inventors: Matthew Frederick Evans, Wyndmoor, PA (US); Jonathan Robert Day, Wilmington, DE (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 207 days.

(21) Appl. No.: 14/669,861

(22) Filed: Mar. 26, 2015

(65) Prior Publication Data

US 2016/0282525 A1    Sep. 29, 2016

(51) Int. Cl.
G02B 5/124    (2006.01)
G01C 15/02    (2006.01)
G02B 7/182    (2006.01)
G02B 5/122    (2006.01)

(52) U.S. Cl.
CPC ............ G02B 5/124 (2013.01); G01C 15/02 (2013.01); G02B 5/122 (2013.01); G02B 7/182 (2013.01)

(58) Field of Classification Search
CPC ........ G02B 5/124; G02B 5/122; G02B 7/182; G01C 15/02
USPC .................................................. 359/529, 530
See application file for complete search history.

(56) References Cited

U.S. PATENT DOCUMENTS

| | | | | |
|---|---|---|---|---|
| 5,893,214 A | * | 4/1999 | Meier | G01B 11/005 33/293 |
| RE44,150 E | * | 4/2013 | Cramer | G01C 15/002 356/154 |
| 9,329,028 B2 | * | 5/2016 | Bridges | G01B 11/14 |
| 2003/0020895 A1 | * | 1/2003 | Bridges | G01S 7/4811 356/4.01 |
| 2005/0179890 A1 | * | 8/2005 | Cramer | G01B 11/002 356/138 |
| 2005/0185182 A1 | * | 8/2005 | Raab | G01S 7/497 356/399 |
| 2009/0109426 A1 | * | 4/2009 | Cramer | G01B 11/005 356/154 |
| 2011/0176145 A1 | * | 7/2011 | Edmonds | G01B 11/026 356/601 |
| 2011/0284384 A1 | * | 11/2011 | Hubbs | G02B 5/122 205/50 |

(Continued)

FOREIGN PATENT DOCUMENTS

DE    102006046435 A1    4/2008
JP    S63138539 A    6/1988

OTHER PUBLICATIONS

International Search Report and Written Opinion for Application No. PCT/US2015/023482 dated Dec. 8, 2015; 11 pgs.

*Primary Examiner* — Bumsuk Won
*Assistant Examiner* — Grant Gagnon
(74) *Attorney, Agent, or Firm* — Cantor Colburn LLP

(57) ABSTRACT

A spherically mounted retroreflector (SMR) includes a replicated optic, a substrate, and an adhesive. The replicated optic, which includes a cube-corner retroreflector, has a base area smaller than the retroreflector area. The substrate has a partially spherical outer surface and a cavity sized to accept the replicated optic. An adhesive attaches the optic to the substrate.

14 Claims, 7 Drawing Sheets

TOP VIEW

(56) References Cited

U.S. PATENT DOCUMENTS

| | | | |
|---|---|---|---|
| 2012/0206716 A1* | 8/2012 | Cramer | G01B 11/03 356/72 |
| 2012/0206808 A1* | 8/2012 | Brown | G02B 5/122 359/529 |
| 2013/0202010 A1 | 8/2013 | Cramer et al. | |
| 2014/0098381 A1* | 4/2014 | Bridges | G01B 11/002 356/614 |
| 2014/0098382 A1* | 4/2014 | Bridges | G01B 5/0014 356/614 |
| 2014/0098383 A1* | 4/2014 | Bridges | G01C 15/002 356/614 |
| 2014/0313521 A1* | 10/2014 | Bridges | G01S 17/66 356/614 |
| 2014/0340750 A1* | 11/2014 | Neal | G02B 5/122 359/529 |
| 2015/0022826 A1* | 1/2015 | Cramer | G01S 17/66 356/620 |
| 2015/0285615 A1* | 10/2015 | Bridges | G01S 17/42 356/4.01 |
| 2015/0285903 A1* | 10/2015 | Bridges | G01C 15/002 356/4.01 |
| 2015/0308818 A1* | 10/2015 | Bridges | G01S 17/66 356/3.02 |
| 2016/0341541 A1* | 11/2016 | Bridges | G01B 11/002 |

\* cited by examiner

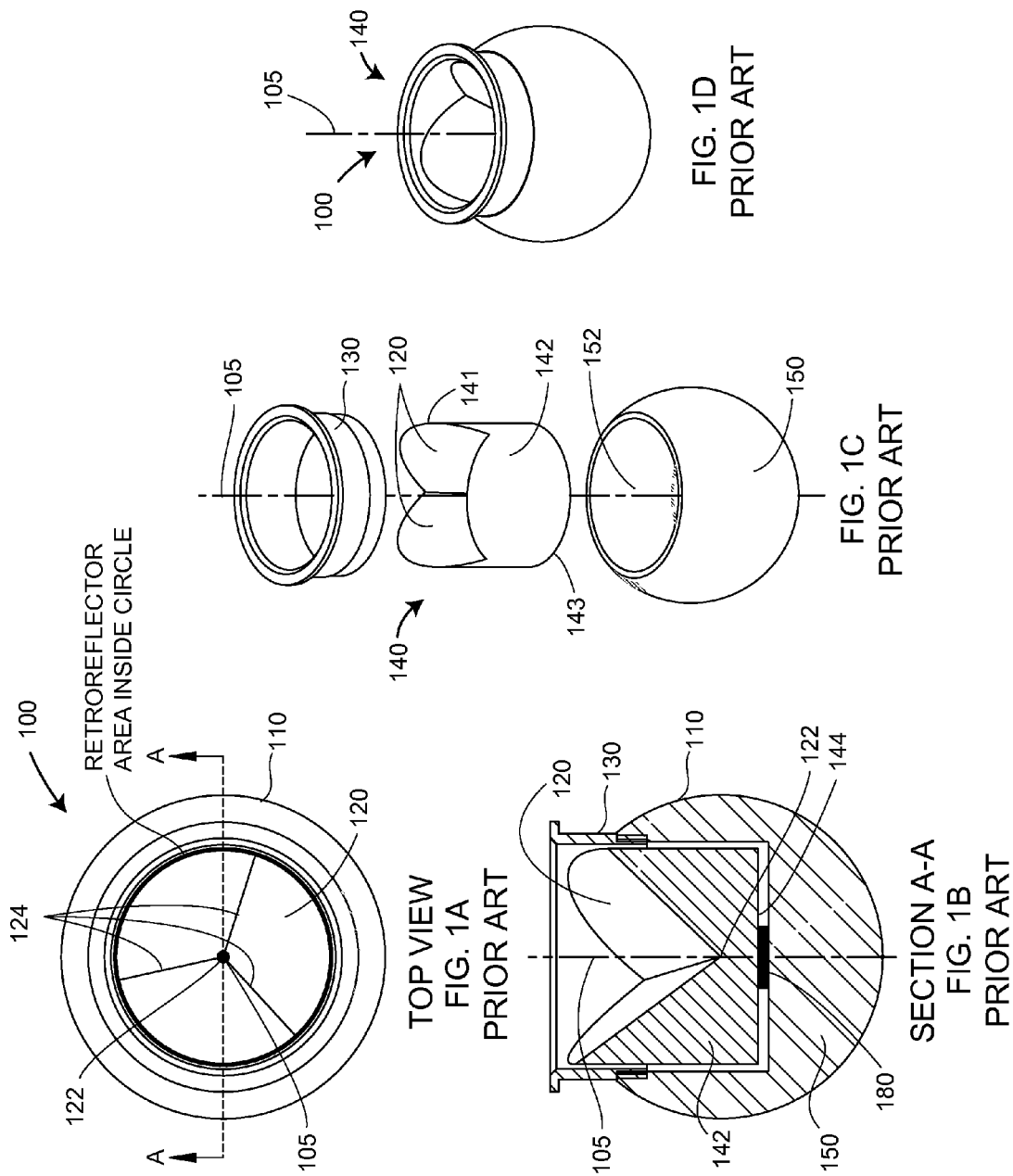

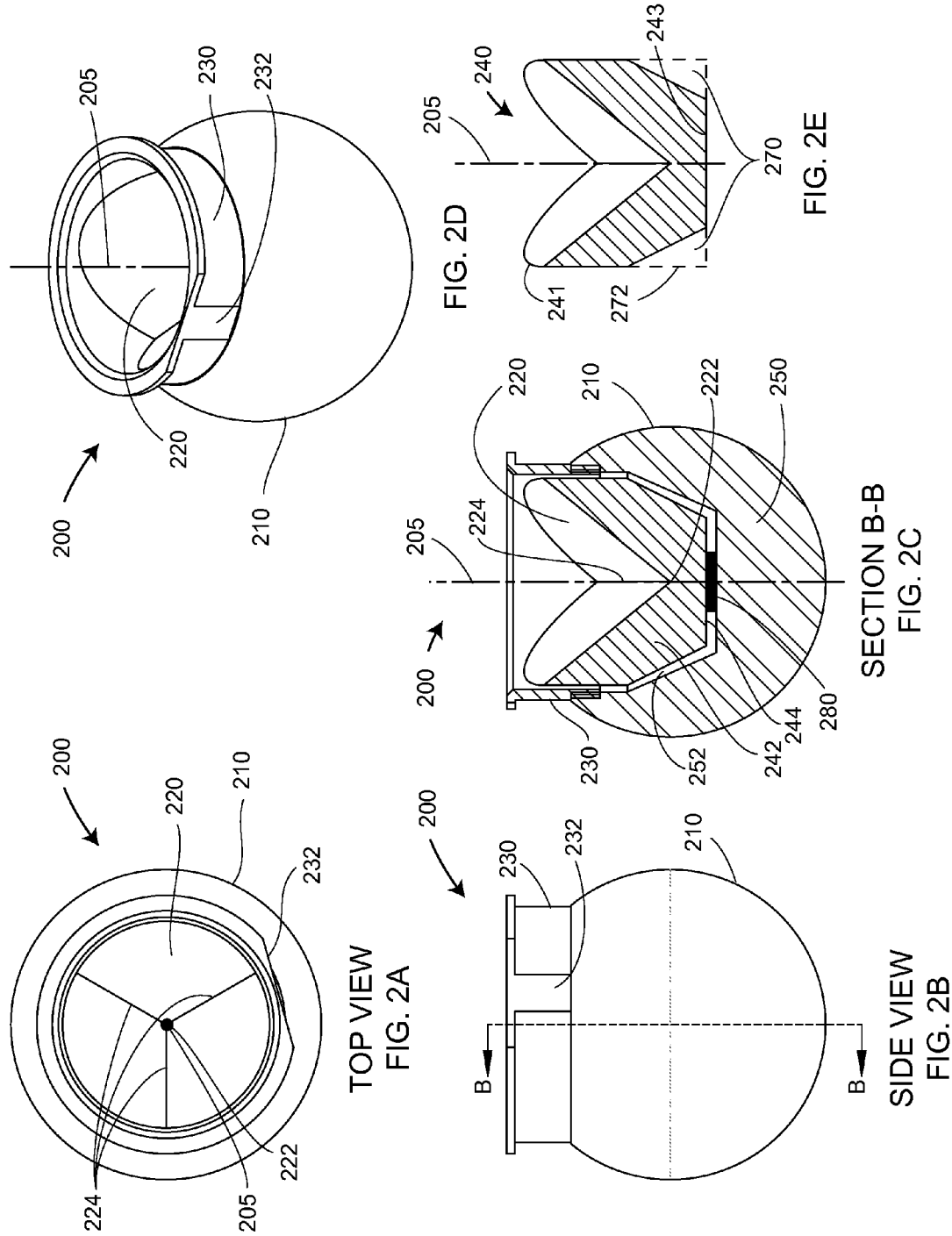

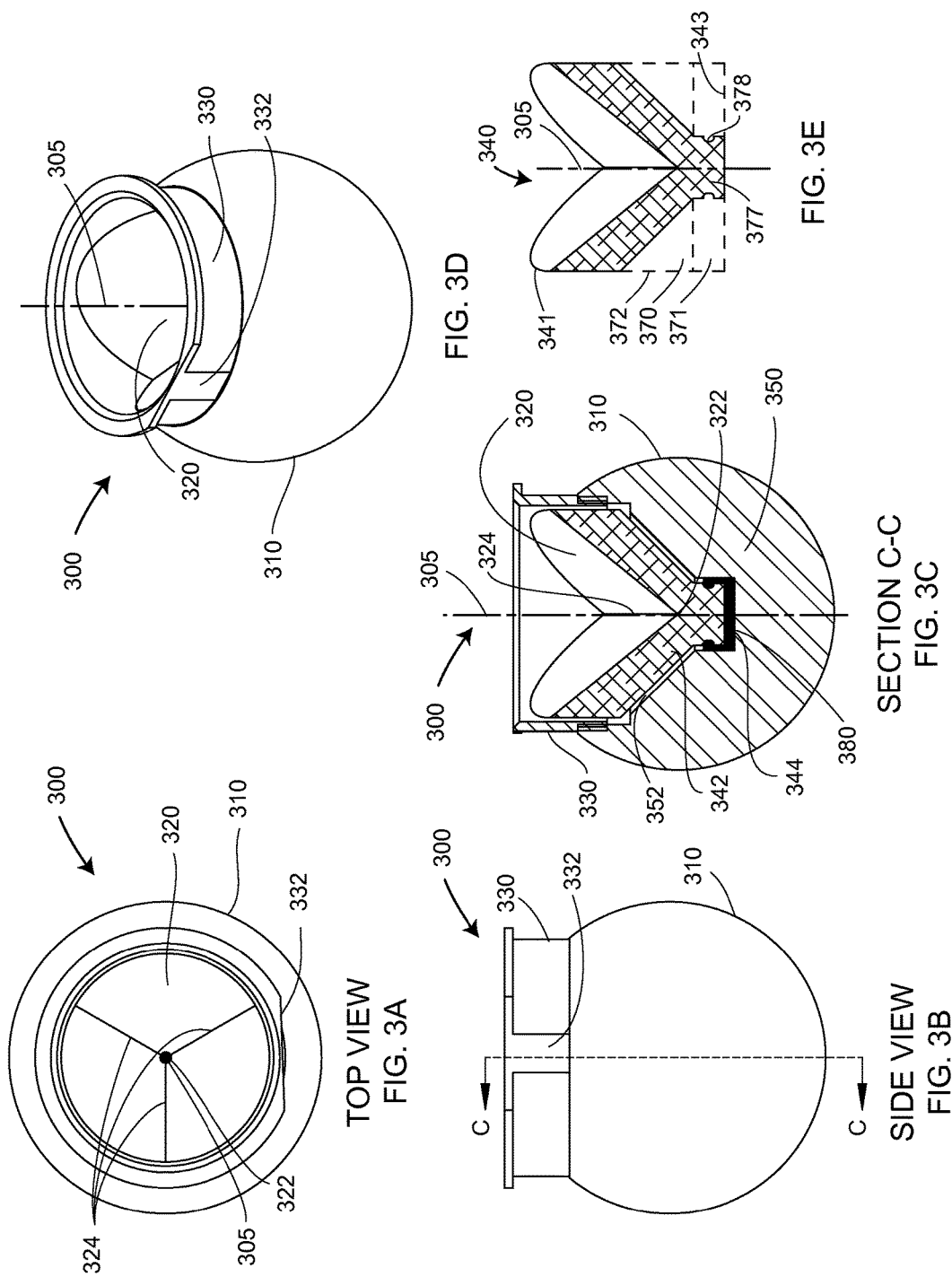

SECTION D-D

TOP VIEW

SECTION E-E

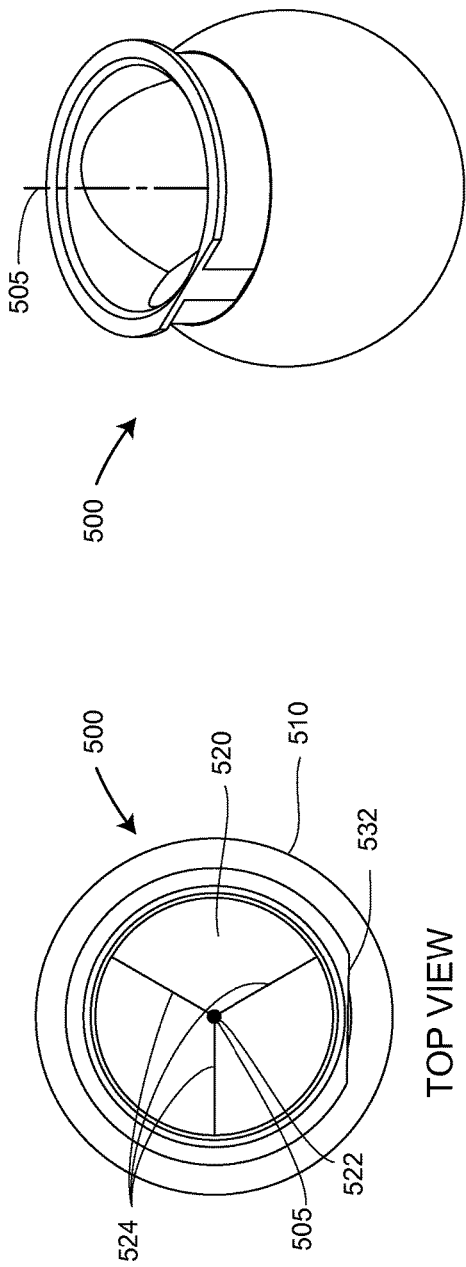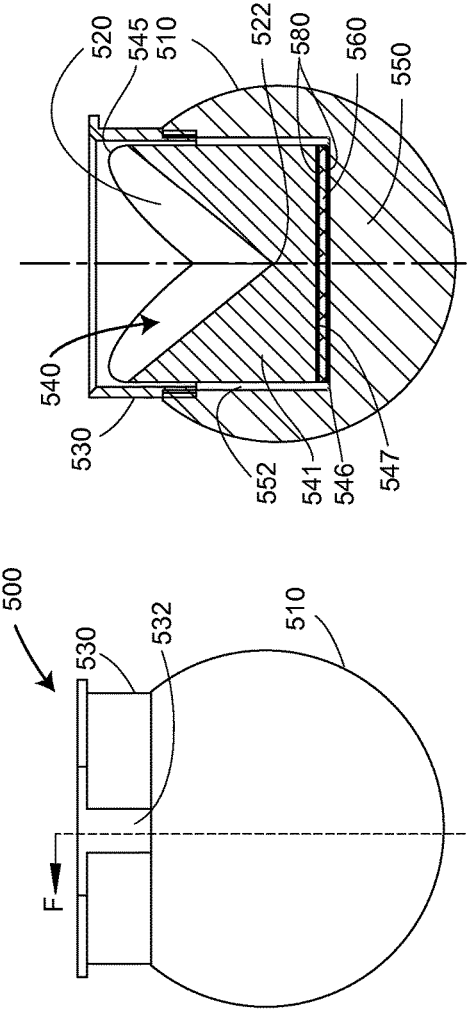

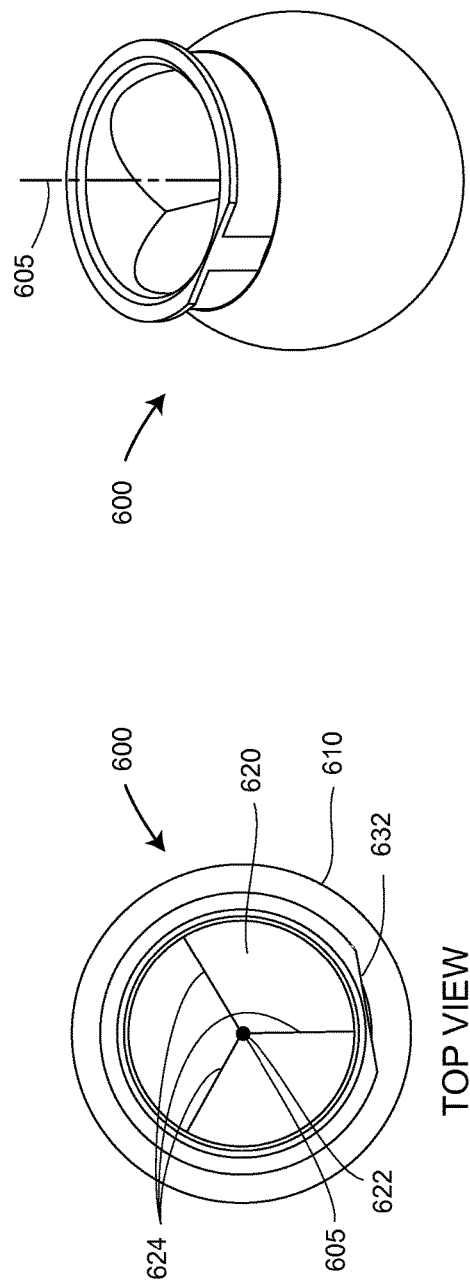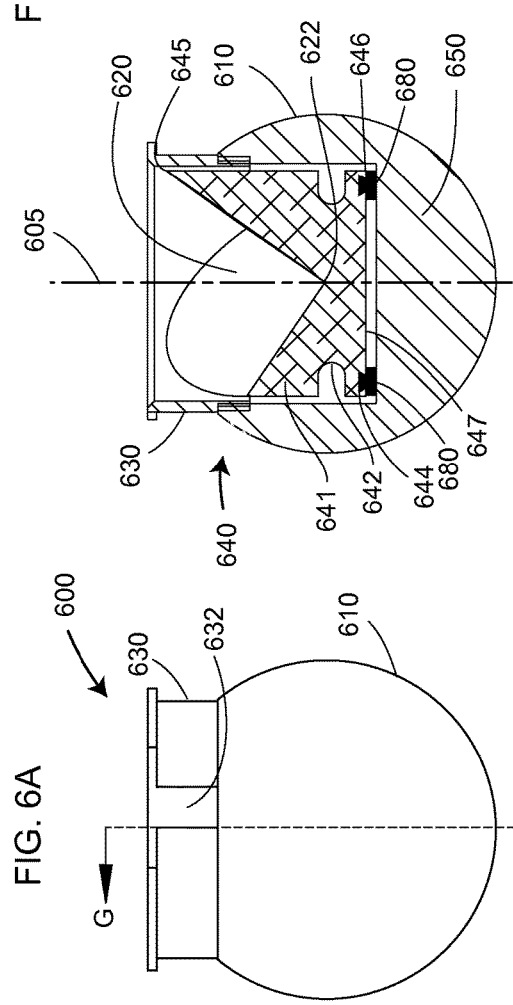

SPHERICALLY MOUNTED RETROREFLECTOR THAT INCLUDES A REPLICATED CUBE CORNER

BACKGROUND OF THE INVENTION

The present disclosure relates generally to spherically mounted retroreflectors that include an embedded cube-corner retroreflector.

A laser tracker instrument measures the coordinates of a point by sending a laser beam to a retroreflector target in contact with the point. The instrument determines the coordinates of the point by measuring the distance and the two angles to the target. The distance is measured with a distance-measuring device such as an absolute distance meter (ADM) or an interferometer (IFM). The angles are measured with an angle-measuring device such as an angular encoder. A gimbaled beam-steering mechanism within the instrument directs the laser beam to the point of interest.

Ordinarily the laser tracker sends a laser beam to a retroreflector target. A common type of retroreflector target is the spherically mounted retroreflector (SMR), which includes a cube-corner retroreflector embedded within a metal sphere. The cube-corner retroreflector includes three mutually perpendicular mirrors. The vertex, which is the common point of intersection of the three mirrors, is located near the center of the sphere. Because of this placement of the cube corner within the sphere, the perpendicular distance from the vertex to any surface on which the SMR rests remains nearly constant, even as the SMR is rotated. Consequently, the laser tracker can measure the 3D coordinates of a surface by following the position of an SMR as it is moved over and held in contact with the surface. Stating this another way, the laser tracker needs to measure only three degrees of freedom (one radial distance and two angles) to fully characterize the 3D coordinates of a surface.

The most precise applications are pushing for every micron of accuracy possible so every element of the SMR is important. The most accurate SMR models require the highest precision and quality spheres, near perfect geometry and clarity of the optics, assembled with processes that hold mere microns as tolerances. These state of the art opto-mechanical assemblies are verified by high performance instruments in temperature controlled rooms to confirm that design criteria are fully met. When combined with modern laser trackers, extreme accuracy and range are achievable.

Presently, there are three basic configurations of retroreflectors in SMRs: a solid glass retroreflector, an open-air retroreflector, and a version of the open-air SMR that has a window covering. Construction of an SMR starts with a solid sphere, which in most cases is made of stainless steel. SMRs are expected to be accurate and durable and it is the steel sphere that provides the contact surface for the measurement and protects the optics from damage during use. Different alloys of stainless steel are used to balance magnetic properties against corrosion resistance. Steel spheres are categorized into grades that describe their dimensional properties. A common ball grade for an SMR is Grade 25. The number 25 refers the sphericity in millionths of an inch (0.000025 inches). The other properties of the ball are also controlled by the grade specification. A Grade 25 ball specifies a surface roughness tolerance of no more than 0.000002 inches and a diameter tolerance of +/−0.0001 inches.

The heart of the SMR is the cube-corner retroreflector. In one type of SMR, three flat glass panels are bonded together to make the cube-corner retroreflector. Before the flat glass panels are assembled into cube corners, they are most often coated with protected silver. The panels are often matched to minimize polarization effects and reflectance variation. The three glass panels are bonded into an assembly, which is centered in the sphere. Glass-panel SMRs can provide some of the highest performance targets available. However, a weakness of glass-panel SMRs is the glass panels themselves, which are easily broken if dropped, subjected to an impact load, or just not handled carefully.

Through the common handling abuse that may occur during daily use, the adhesive bonding to the three glass panels can release the whole optical assembly, or a single panel within the assembly can shift from its nominal position. This can distort the beam and lead to errors in measurements.

A second type of SMR is the integrated optic SMR, which is a solid steel sphere where the retroreflector is machined directly into the sphere. Creating the three mutually perpendicular surfaces into a hardened sphere requires time and expensive processes such as electrical discharge machining (EDM) that lead to the higher costs. The optical reflective surfaces are transferred into the sphere through a process called replication. A replicated optic begins by coating a master with a release layer, a thin layer or gold, and a thin layer of epoxy. The machined metal is referred to as a substrate and is pressed onto the master and allowed to cure. The adhesive layer takes up any variation in the surface of the substrate leaving a precise copy of the master when removed from the tool. While this design represents the most break resistant and stable design, machining of the hardened steel has limited the possible accuracy. Unlike glass panels having surfaces that are stiff and flat, replicated optics have surfaces that are relatively soft and can be damaged through aggressive cleaning. Because the entire SMR is made almost entirely of steel, with only a thin epoxy layer, the integrated optic SMR design has proven to be very stable over extreme temperature changes.

A third type of SMR features a single replicated optic mounted into a hardened stainless steel sphere. The optic is manufactured in a replication process similar to that of the integrated optic SMR, with the difference being the material out of which the cube-corner optic is made. In place of the difficult and expensive to machine hardened steel, aluminum is used for the substrate. The single optic is an aluminum cylinder with the three mutually perpendicular faces machined and the gold reflective surfaces applied through replication. Because the aluminum-based optic is easier to manufacture it offers a middle ground in cost. The assembly process is similar to that of the glass panel SMR in that the retroreflector is centered in the sphere and secured by a high performance adhesive. This design allows for very precise centering, yielding an SMR with high accuracy.

The second type of SMR is inherently break resistant, and it is possible through careful design to also make the third type of SMR break resistant. Break-resistant SMRs may be dropped onto a hard floor without the vertex of the SMR moving in relation to the SMR spherical surface. To make the third type of SMR break resistant, the type and thickness of the adhesive layer must be carefully considered in light of the properties of the replicated slug and the spherical portion.

In view of the high degree of accuracy required of SMRs, it will be appreciated that the different SMR properties can significantly impact a laser tracker's ability to track and measure to the fullest of its capabilities. The stainless steel ball can contribute to measurement uncertainty if the sphericity or diameter is not known accurately or if it becomes worn and develops flat spots or areas where the diameter is not nominal. Radial measurement systems are susceptible to polarization errors in an improperly manufactured SMR. A common cause of polarization error is the uneven application of the protective coatings on protected silver retroreflectors. Most laser tracker systems are sensitive to polarization in one mode or another. If the SMR causes the polarization state to change and the IFM system requires a certain state, then the optical interference pattern may not be created clearly. Some laser trackers utilize a polarization modulation technology for their ADM that could be impacted by a changed polarization state of an SMR. Mirrors with poor reflectance from poor coatings or damaged optical surfaces will return a weak signal. In this case, the SMR may track poorly or, more importantly, the ADM or IFM system may have reduced measurement accuracy. The transverse measurement performance can be impacted by the SMR as described in ASME B89.4.19-2006, Appendix B. The B89 document discusses 3 types of SMR uncertainty contributions. The first two are mechanical properties related to the lateral and radial centering of the retroreflector in the sphere. The third property is related to dihedral angle errors. The dihedral angle error is the deviation in the angles of the adjacent panel from perpendicular. This deviation can cause measurement errors in trackers for the case in which a position sensitive detector (PSD) "retrace point" is not properly set. Laser trackers are compensated to establish the retrace position but this compensation is not perfect. Consequently, it is important that the SMR is manufactured to a specific dihedral angle tolerance and that these dihedral angles are maintained over use. An explanation of the condition in B89.4.19, Appendix B, is where one or two of the SMR panels have a high dihedral angle error in respect to the others. As a result, the optical center can be shifted and not represent the mechanical center of the retroreflector. The offset beam will cause the apparent center of the beam to change as the SMR is rotated in a nest. This type of error is called runout error and may be the result of either the cube corner within the sphere being off center or a dihedral angle error. However, the runout patterns have a different appearance when the cube corner is off center and dihedral angle error exists, as is explained in the B89.4.19 standard, Appendix B.

Another dihedral angle error occurs when all three panels are tilted into the center or away from the center. If the beam becomes expanded enough on the return, it can clip on the optics and cause the beam on the PSD not to be round (Gaussian) as is preferred.

Beyond the errors in the centering of the vertex with respect to the spherical surface, there are several other specifications that are significant to an SMR's performance. An SMR is supposed to return the laser beam to the tracker without added distortion. SMR induced errors can be the result of dihedral angle errors, as described above, or wave front distortion. Dihedral angle errors are generally reported with two values: total error and adjacent angle error.

Total error can cause the beam to expand or contract on the return path to the tracker. This may cause the beam shape to distort. Adjacent angle error, on the other hand, can lead to a shift in the optical center of the beam and produce optical runout when rotating the SMR. Wavefront distortion is a measure of the change in the wavefront shape as a result of reflection off the mirror panels of the SMR. It may be caused by panels that are not perfectly flat. When the laser beam is reflected off an SMR having panels that are not flat, the wavefront is altered from its original flat form. This can result in increased error in the systems of the tracker, including the IFM, ADM, and angle measuring systems. The term wavefront distortion refers to a composite measurement of distortion that includes effects due to panel flatness and dihedral angle errors since both effects influence the wavefront of the laser beam returning from the retroreflector. Within the reflective region of the SMR, the center of the target is the most critical as this is the area where the power of the laser beam is most concentrated.

A specification that quantifies the quality of the retroreflector in this critical region is called central wavefront distortion. As an example, this specification may consider wavefront quality over just the central 6 mm region of the cube corner.

To meet customer requirements, an SMR needs to maintain the required performance over the temperature range of the laser tracker and not be permanently altered at the even more extreme potential storage temperatures. The storage temperature range is typically −40° C. to 70° C., while the operating temperature range is typically −15° C. to 50° C. The target needs to be able to be subjected to these extreme storage temps and return to the in-tolerance specifications and geometry for the operational temperature range.

In addition to withstanding the above noted temperature ranges, to be considered break-resistant, the SMR must be capable of maintaining the optic in the proper position over the operational temperature range while withstanding at least 10 drops to a concrete floor from a standard operating height. At the same time, it has to be stiff enough to maintain the cube corner at the same position over time.

There are two types of mechanical deformation that can occur under strain of extreme temperature changes, with or without impact loading; elastic and plastic. Elastic deformation means that the geometry of the SMR may exceed tolerance at the ends of the storage temperature range but return to an in-tolerance condition within the operating temperature range. Plastic deformation means that the geometry of the SMR is permanently altered to an out-of-tolerance condition even when returned to ambient temperatures.

As explained hereinabove, an SMR is an extremely high precision instrument, where the vertex of a cube-corner retroreflector within an SMR is ideally placed at the exact center of the sphere into which the cube-corner is embedded. In practice, however, the position of the vertex is off the center of the sphere by up to a few thousandths of an inch. In many cases, the difference in the positions of the vertex and the sphere center are known to high accuracy, but for some SMR designs the position of the vertex relative to the sphere center may change significantly with temperature. Furthermore, this data may be rendered valueless if the SMR is subjected to extreme temperatures and/or is dropped or subjected to an impact force that displaces the vertex of the cube-corner retroreflector.

A particular difficulty encountered in the manufacture of SMRs is obtaining the very small value of sphericity ordinarily desired—for example, a sphericity of 25 millionths of an inch for a grade 25 ball. In one machining strategy, a cavity is machined into a sphere to provide a pocket for a retroreflector insert. In some cases, the sphericity of the ball may be degraded by machining the cavity. To avoid this potential degradation, another machining operation may be performed afterwards to obtain the desired sphericity. Ordinarily an SMR must be both very hard and non-corrosive. To obtain the desired corrosion resistance, a material such as SAE 440 stainless steel may be used. The selected material should have high corrosion resistance, easy machinability, suitable coefficient of thermal expansion (CTE), and relatively low cost. To also obtain the desired hardness of the SAE 440 stainless steel while maintaining the ability to machine the ball, the ball may be machined first and heat treated afterwards by raising the temperature to between 1010 and 1065° C. to harden the steel. A potential problem with this approach is that the heat treatment may degrade the sphericity of the sphere.

While existing SMRs may be suitable for their intended purpose, there remains, however, a need in the art for SMRs that are heavy duty, have improved break resistance over specified temperature ranges, maintain good centering of the vertex within the spherical surface of the SMR, have good sphericity, and are economical to fabricate.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

In an embodiment of the invention, a spherically mounted retroreflector (SMR) includes: a replicated optic having a retroreflector end and a base end, the retroreflector end including a cube-corner retroreflector having a vertex and an axis of symmetry, the cube-corner retroreflector having a retroreflector area along a plane perpendicular to the axis of symmetry, the replicated optic having a base area at the base end, the base area being smaller than the retroreflector area; a substrate comprising a partially spherical outer surface and a cavity, the cavity sized to accept the replicated optic, the partially spherical outer surface having a sphere center coincident with the vertex; and an adhesive disposed between the replicated optic and the substrate that fixedly adheres the optic to the substrate.

In another embodiment of the invention, a spherically mounted retroreflector (SMR) includes: a replicated optic having a retroreflector end and a base end, the retroreflector end including a cube-corner retroreflector having a vertex; a substrate comprising a partially spherical outer surface and a cavity, the cavity sized to accept the replicated optic, the partially spherical outer surface having a sphere center coincident with the vertex; a spacer placed between the base end of the replicated optic and the substrate; and an adhesive disposed between the replicated optic and the spacer and further disposed between the spacer and the substrate, the adhesive fixedly adhering the spacer, the optic, and the substrate.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures:

FIGS. 1A, 1B, 1C, and 1D depict top, cross-sectional, exploded perspective, and perspective views, respectively, of a prior-art SMR;

FIGS. 2A, 2B, 2C, 2D, and 2E depict top, side, cross-sectional, perspective views, and partial cross-section views, respectively, of an SMR according to an embodiment;

FIGS. 3A, 3B, 3C, 3D, and 3E depict top, side, cross-sectional, perspective views, and partial cross-sectional views, respectively, of an SMR according to an embodiment;

FIGS. 5A, 5B, 5C, and 5D depict top, side, cross-sectional, and perspective views of an SMR according to an embodiment; and FIGS. 6A, 6B, 6C, and 6D depict top, side, cross-sectional, and perspective views of an SMR according to an embodiment.

DETAILED DESCRIPTION OF THE INVENTION

Figure 1E:
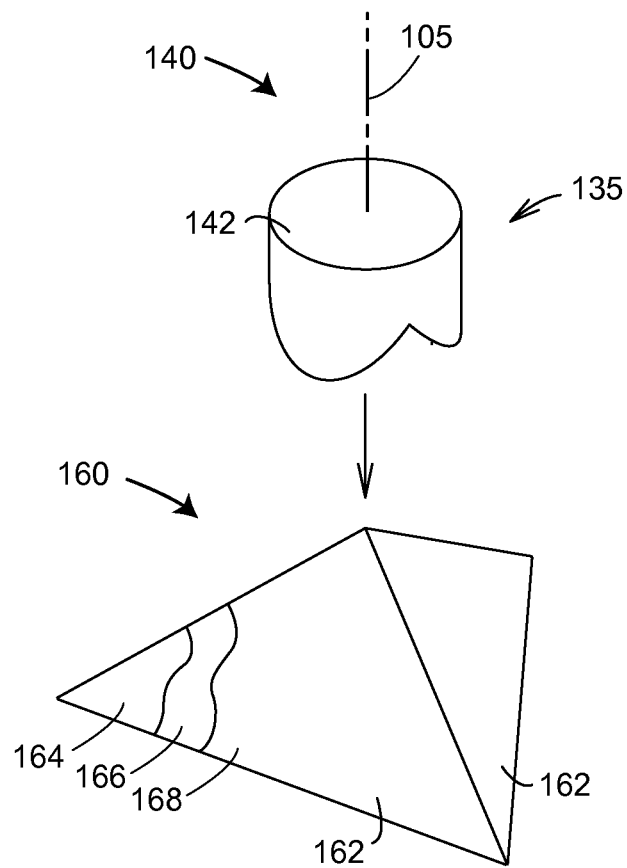
FIG. 1E is a perspective view of a replicated optic and master in a manufacturing process.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

An embodiment of the invention, as shown and described by the various figures and accompanying text, provides an SMR having a substrate, an optic and an adhesive, the combination manufactured so as to provide desirable attributes including good sphericity and flat reflective surfaces.

To accomplish the above noted goals, several embodiments are provided herein below, including cavities and corresponding replicated cube-corner elements that include embodiments for matching shapes having (1) a conical form, (2) an extended conical form, (3) a faceted form, (4) a cylindrical form that includes a spacer, and (5) a strain-relief form. Each embodiment is now described in turn.

FIG. 1A shows a top view of the prior-art SMR 100. The replicated optic 140 has material 142 having a generally cylindrical shape. The replicated optic is formed with three reflecting surfaces 120 that intersect in intersection lines 124, which come together at an apex 122. The cross section A-A of FIG. 1B and disassembled assembly view of FIG. 1C show that the substrate 150 in the shape of a partial sphere includes a cylindrical cavity 152 sized to hold the replicated optic 140. An optional collar 130 is placed around the replicated optic 140 to protect the optic 140 and provide an operator a convenient way to grip the SMR.

The axis of symmetry 105 passes through the vertex 122 and is parallel to the long axis of the replicated optic 140. As can be seen in FIGS. 1A-E, the axis of symmetry also passes through the centers of the substrate 150 and the collar 130. The axis of symmetry 105 is also symmetrical with respect to the three intersection lines 124.

The replicated optic 140 has a retroreflector end 141 and a base end 143. The retroreflector end 141 is the end of the replicated optic 140 adjacent to the cube-corner retroreflector (see reference numerals 120 for example). The base end 143 is the end adjacent to the base 144 (the bottom of the replicated optic 140). The replicated optic 140 has a retroreflector area (see reference numerals 120 for example), which is the area of the cube-corner retroreflector when viewed along the axis of symmetry 105. The retroreflector area is indicated in FIG. 1A as the area inside the noted circle. In other words, the retroreflector area is the area of the cube-corner retroreflector in a plane perpendicular to the axis of symmetry 105. The base area is similarly the area of the base 144. These definitions of retroreflector area and base area also apply to FIGS. 2A-E, 3A-E, and 4A-E.

In an embodiment illustrated in FIG. 1E, the replicated optic 140 is manufactured by first machining or molding a replica form 135, which may be made out of aluminum, for example. In an embodiment, the replica form is machined into approximately the right shape using standard machining tools such as end mills and lathes. The three mutually perpendicular surfaces are pressed onto a precisely shaped master 160 coated with a release layer 164, a thin layer of gold 166, and a layer of epoxy 168. After the epoxy has set, the master is pulled away, leaving the replicated optic with a smooth, reflective, optical quality coating on the finished replicated optic 140. The replicated optic 140 is attached to the substrate 150 with an adhesive 180 such as epoxy.

A potential limitation of the prior art design of FIG. 1 is that a relatively large amount of material must be removed from a sphere to obtain a cylindrical cavity 152 in the substrate 150. Removal of the relatively large amount of material tends to deform the partially spherical shape of the outer surface 110 of the substrate 150. The deviation of the outer surface 110 from the ideal spherical shape is quantified by the form error of the sphere, which is also referred to as the sphericity. For example, a high quality SMR may be grade 25, requiring that the sphericity be 25 microinch (about 0.635 micrometer) or less. If the machining of the cavity deforms the spherical shape of the substrate 150 too much, a secondary machining process may be carried out to re-establish the spherical surface profile. An example of a possible secondary machining process is a lapping process in which a slurry containing grit of a specified size is applied to the substrate in a controlled way to abrade the surface 110 to the desired spherical shape and smoothness. Even after a secondary machining process is applied, however, a further difficulty may result from a heat treating of the substrate 150. Such heat treatment may be applied to a material such as SAE 440C stainless steel for example to obtain the desired hardness. Such heat treatment may cause distortion of the surface 110, especially if the cavity 152 is large.

Another potential disadvantage of having a relatively large cavity 152 is that the mass of the replicated optic 140 is relatively large, which makes it more likely to move or loosen when shocked, for example, when dropped on a cement floor. Because of its reduced mass, a replicated optic 140 is more resistant to shock when it is configured to conform to a relatively small cavity.

Reference is now made to FIGS. 2A-E, 3A-E, 4A-F, 5A-D and 6A-D, where each SMR described in detail herein below respectively has a substrate that includes a partially spherical outer surface and a cavity, the cavity being sized to accept a replicated optic, the partially spherical outer surface having a sphere center coincident with the vertex of the replicated optic, in addition to other features herein described below.

FIGS. 2A-E show an SMR 200 having three reflective faces 220, intersection lines 224, vertex 222, and axis of symmetry 205. Optional flat surface 232 in the collar 230 is provided to enable the SMR 200 to be rotated farther downward in a magnetic nest that holds the SMR. FIGS. 2C and 2E show cross-sectional views of an embodiment in which a portion 270 of the material 242 is removed from the cylindrical shape 272 to reduce the size of the cavity 252 in substrate 250 and to reduce the mass of the replicated optic 240. The cylindrical shape 272 has a diameter equal to the cube-corner retroreflector and an axis parallel to the axis of symmetry 205. In an embodiment, the cavity 252 may be machined in the shape of a truncated cone, as shown in FIG. 2C. The cavity 252 of the substrate 250 is machined to have generally the same shape, complementary shape, as the replicated optic 240, which is held in place via an adhesive 280, such as epoxy for example. It is contemplated that removal of the portion 270 will provide advantages in helping retain a spherical shape 210 of the substrate 250. It is also contemplated to provide better shock resistance, as explained herein above. The replicated optic 240 has a retroreflector end 241, a base end 243, a base 244, a retroreflector area, and a base area, similar to those features described above in connection with FIG. 1, but modified as herein disclosed and illustrated, which may be further modified by other features herein disclosed and illustrated, in accordance with an embodiment of the invention.

FIGS. 3A-E show an SMR 300 having three reflective faces 320, intersection lines 324, vertex 322, and axis of symmetry 305. A flat surface 332 may be provided on the collar 330. FIGS. 3C and 3E show cross-sectional views of an embodiment in which a first portion 370 and a second portion 371 are removed from the material 342 in the cylindrical shape 372. The first portion 370 may be machined to leave material 342 in the shape of a truncated cone as indicated in FIGS. 3C and 3E. The second portion 371 is removed to leave material 342 having a protruding portion 377, which in an embodiment has a cylindrical shape. In an embodiment, a recessed groove 378 is provided in the protruding portion 377. The cavity 352 of the substrate 350 is machined to have generally the same shape, complementary shape, as the replicated optic 340. It is contemplated that removal of the first and second portions 370 and 371 will provide advantages in helping retain the spherical shape 310 of the substrate 350. A first advantage of the embodiment of FIGS. 3A-E compared to the prior art design of FIGS. 1A-E is that less material needs to be removed from the substrate 350, thereby making it easier to obtain the required sphericity. A second advantage is that the replicated optic 340 is lighter, thereby making it more resistant to shock. A third advantage is that an adhesive 380, such as an epoxy for example, may be applied mainly to the sides and bottom of the protruding portion 377, thereby reducing the stresses applied by the adhesive 380 to the replicated optic 340 relative to the prior art design illustrated in FIGS. 1A-E. A fourth advantage is that shock applied to the SMR 300 cannot dislodge the replicated optic 340 until the adhesive 380 in the groove 378 is sheared off. The force required to provide this shearing action is greater than would be required in the designs of FIGS. 1A-E or FIGS. 2A-E. The replicated optic 340 has a retroreflector end 341, a base end 343, a base 344, a retroreflector area, and a base area, similar to those features described above in connection with FIG. 1, but modified as herein disclosed and illustrated, which may be further modified by other features herein disclosed and illustrated, in accordance with an embodiment of the invention.

Figure 4D:
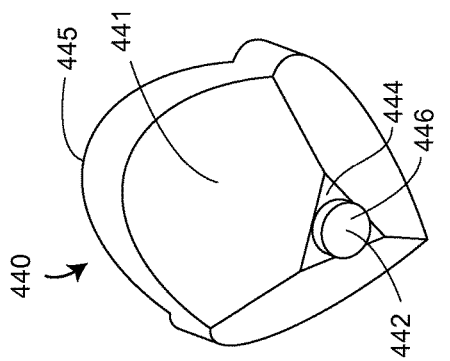
FIGS. 4A, 4B, 4C, 4D, 4E, and 4F depict top, first cross-sectional, second cross-sectional, first partial perspective, second partial perspective, and perspective views, respectively, of an SMR according to an embodiment.
Figure 4E:
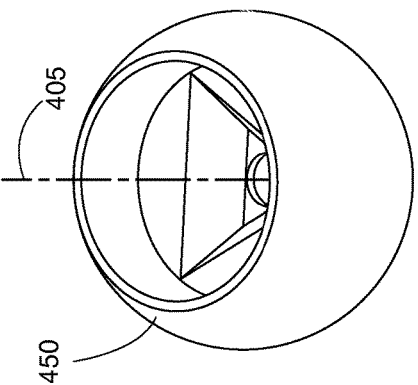
Figure 4B:
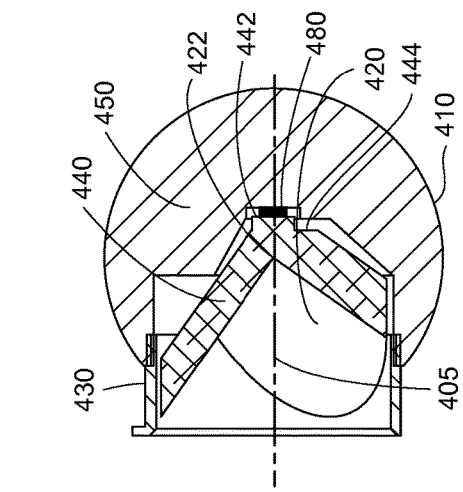
Figure 4F:
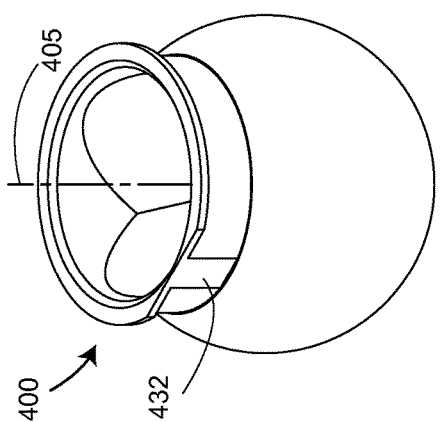
Figure 4A:
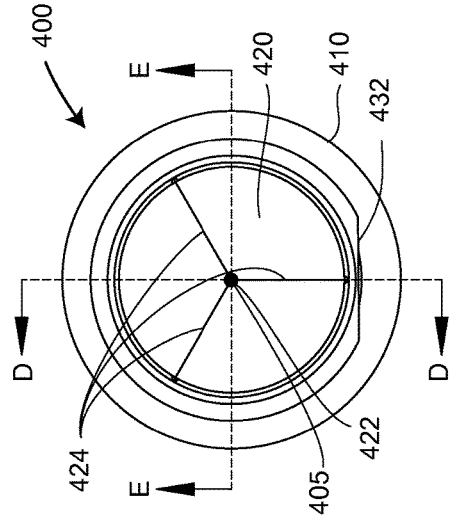
Figure 4C:
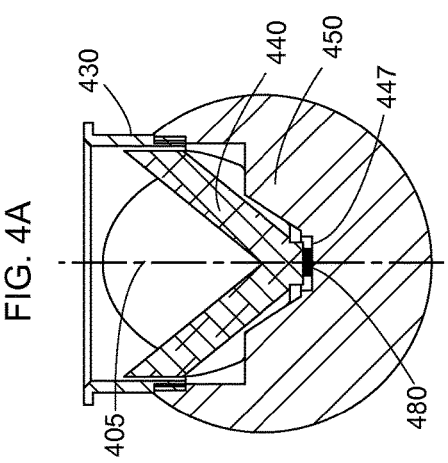

FIGS. 4A-E show an SMR 400 having three reflective faces 420, intersection lines 424, vertex 422, and axis of symmetry 405. A flat surface 432 may be provided on the collar 430. Cross-sectional views of FIGS. 4B and 4C and the perspective view of FIG. 4D show an embodiment in which a first portion of material is removed relative to a cylindrical shape of the replicated optic 440 so as to leave three replicated planar outer surfaces 441 parallel to the three respective reflective surfaces 420. In addition, a second portion of material is removed relative to an overall cylindrical shape of the replicated optic 440 so as to leave a protruding portion 442, which in an embodiment is a relatively small cylinder. A flat region 444 connects the protruding portion 442 to the flat surfaces 441. The substrate 450 is machined so as to accept the replicated optic 440 and to generally match the shape of the replicated optic 440, which is held in place via an adhesive 480, such as epoxy for example. It is contemplated that removal of the first and second portions of material will provide advantages in helping retain the spherical shape 410 of the substrate 450. The replicated optic 440 has a retroreflector end 445, a base end 446, a base 447, a retroreflector area, and a base area, similar to those features described above in connection with FIG. 1, but modified as herein disclosed and illustrated, which may be further modified by other features herein disclosed and illustrated, in accordance with an embodiment of the invention.

FIGS. 5A-D show an SMR 500 having three reflective faces 520, intersection lines 524, vertex 522, and axis of symmetry 505. A flat surface 532 may be provided on the collar 530. A cross-sectional view in FIG. 5C shows a spacer 560 sandwiched between a replicated optic 540 and a substrate 550 having a cavity 552. In an embodiment, the cavity in the substrate 550 is generally cylindrical, sized to hold the replicated optic 540, which is made from material 541 that is also generally cylindrical. In an embodiment, the spacer 560 is made of metal, such as aluminum for example. By sandwiching and adhering via an adhesive 580 the spacer 560 between the replicated optic 540 and the substrate 550, the stress normally applied to the replicated optic 540 is instead applied to the spacer 560, thereby resulting in a reduced tendency to distort the flat reflector surfaces 520. In many instances, the CTE is different for each of the substrate 550, optic 540, and adhesive 580. For example, the substrate 550 may be 440C stainless steel, which has a CTE of 10.1 ppm/° C. at 20° C. The replicated optic 540 may be made of aluminum 6061 having a CTE of 23.4 ppm/° C. at 20° C. The adhesive 580, such as an epoxy for example, used to attach the optic 540 to the substrate 550 may have a CTE of 13.5 ppm/° C. at 20° C. Even if the adhesive 580 cures stress free, stresses may develop between the substrate 550 and the optic 540 as a result of the differential expansion of the two materials with change in temperature. By placing the spacer 560 between the optic 540 and the substrate 550, most of the stresses will be transferred to the spacer 560 rather than the reflective surfaces 520, thereby helping to retain low waveform distortion in light reflected from the SMR 500. It is contemplated that use of the spacer 560 will provide advantages in helping retain the spherical shape 510 of the substrate 550. The replicated optic 540 has a retroreflector end 545, a base end 546, a base 547, a retroreflector area, and a base area, similar to those features described above in connection with FIG. 1, but modified as herein disclosed and illustrated, which may be further modified by other features herein disclosed and illustrated, in accordance with an embodiment of the invention.

FIGS. 6A-D show an SMR 600 having three reflective faces 620, intersection lines 624, vertex 622, and axis of symmetry 605. A flat surface 632 may be provided on the collar 630. A cross sectional view in FIG. 6C shows a replicated optic 640 that includes a strain relief groove 642 and adhesive-holding circular dovetail groove 644 that extends around the base 647 of the replicated optic 640. In an embodiment, the general shape of the material 641 of the replicated optic 640 is cylindrical, but other shapes are possible. In an embodiment, a ring of adhesive 680, such as epoxy for example, is placed underneath the dovetail groove 644 to hold the replicated optic 640 to the substrate 650. Because the dovetail groove 644 includes an inverted section, a shear force is required to separate the replicated optic 640 from the substrate 650, thereby increasing the resistance of the SMR 600 to shock. The stress relief groove 642 provides a relief to the stress built up between the substrate 650 and the replicated optic 640 in the region of the dovetail groove 644. It is contemplated that this stress relief reduces the stress applied to the reflector panels 620, helping ensure that these panels remain flat, and providing advantages in helping retain the spherical shape 610 of the substrate 650. The replicated optic 640 has a retroreflector end 645, a base end 646, a base 647, a retroreflector area, and a base area, similar to those features described above in connection with FIG. 1, but modified as herein disclosed and illustrated, which may be further modified by other features herein disclosed and illustrated, in accordance with an embodiment of the invention.

While certain combinations of features relating to an SMR have been described herein, it will be appreciated that these certain combinations are for illustration purposes only and that any combination of any of these features may be employed, explicitly or equivalently, either individually or in combination with any other of the features disclosed herein, in any combination, and all in accordance with an embodiment of the invention. Any and all such combinations are contemplated herein and are considered within the scope of the invention disclosed.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A spherically mounted retroreflector (SMR), comprising:
    a replicated optic having a retroreflector end and a base end, the retroreflector end including a cube-corner retroreflector having a vertex and an axis of symmetry, the cube-corner retroreflector having a retroreflector area along a plane perpendicular to the axis of symmetry, the replicated optic having a base area at the base end, the base area being smaller than the retroreflector area;
    a substrate that includes a partially spherical outer surface and a cavity, the cavity sized to accept the replicated optic, the partially spherical outer surface having a sphere center coincident with the vertex; and
    an adhesive disposed between the replicated optic and the substrate that fixedly adheres the optic to the substrate.

2. The SMR of claim 1 wherein a shape of the cavity is generally the same as a shape of the replicated optic.

3. The SMR of claim 1 wherein the replicated optic is shaped as a truncated cone at the base end.

4. The SMR of claim 1 wherein the replicated optic further comprises a recessed groove at the base end, the recessed groove configured to accept a portion of the adhesive.

5. The SMR of claim 1 wherein the replicated optic further comprises a protruding portion at the base end.

6. The SMR of claim 5 wherein the protruding portion is shaped as a cylinder.

7. The SMR of claim 6 wherein the protruding portion further comprises a recessed groove at the base end.

8. The SMR of claim 1 wherein the replicated optic further includes three planar outer surfaces on a side opposite the cube-corner retroreflector, the three planar outer surfaces being respectively parallel to three reflective surfaces of the cube-corner retroreflector.

9. The SMR of claim 8 further comprising a protruding portion at the base end.

10. The SMR of claim 9 wherein the protruding portion is shaped as a cylinder.

11. The SMR of claim 10 wherein a shape of the cavity is generally the same as a shape of the replicated optic.

12. A spherically mounted retroreflector (SMR), comprising:
- a replicated optic having a retroreflector end and a base end, the retroreflector end including a cube-corner retroreflector having a vertex;
- a substrate comprising a partially spherical outer surface and a cavity, the cavity sized to accept the replicated optic, the partially spherical outer surface having a sphere center coincident with the vertex;
- a spacer placed between the base end of the replicated optic and the substrate; and
- an adhesive disposed between the replicated optic and the spacer and further disposed between the spacer and the substrate, the adhesive fixedly adhering the spacer, the optic, and the substrate.

13. The SMR of claim 12 wherein the spacer is made of metal.

14. The SMR of claim 13 wherein the spacer is made of aluminum.

* * * * *